Figure 1:
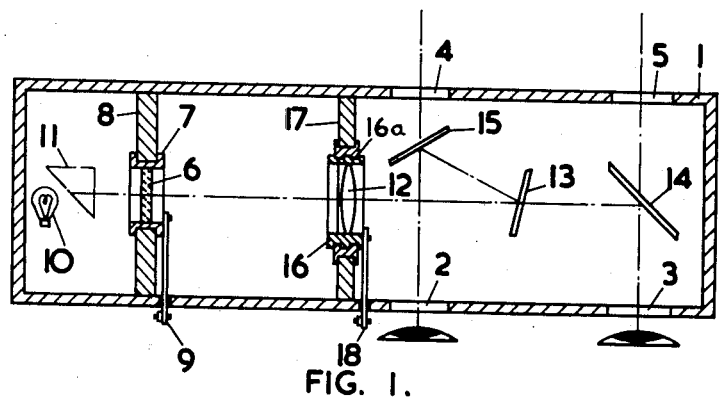

Aug. 17, 1965  N. P. BARTON  3,200,727
CAMERA RANGEFINDERS
Filed Sept. 12, 1960
2 Sheets-Sheet 1

Inventor
NORMAN PERCY BARTON
By
Larson and Taylor
Attorney

Aug. 17, 1965        N. P. BARTON        3,200,727
                   CAMERA RANGEFINDERS
Filed Sept. 12, 1960                    2 Sheets-Sheet 2

Inventor
Norman Percy Barton
By
Lawson and Taylor
Attorney

United States Patent Office 3,200,727
Patented Aug. 17, 1965

3,200,727
CAMERA RANGEFINDERS
Norman Percy Barton, Englefield Green, Surrey, England, assignor to National Research Development Corporation, London, England
Filed Sept. 12, 1960, Ser. No. 55,307
11 Claims. (Cl. 95—44)

This invention relates to stereoscopic rangefinders such as may be fitted to photographic and other cameras. With such a rangefinder indications may be obtained of the range and also the near and far limits of acceptable definition of a camera lens focussed to that range with a selected lens aperture. An observer through the viewing apertures of a rangefinder sees virtual images of an indicating mark or marks in partial reflectors through which he also sees the subject, the positions of the mark being observed by stereoscopic preception. Apparatus of this type is commonly referred to as being of the wandermark type. The marks are preferably on a diapositive, illuminated by either daylight or a calibrated light source, and appear in the viewing apertures as, for example, bright spots. When a calibrated light source is employed the instrument is also usable as a spot photometer.

Many present day cameras are fitted with rangefinders which are coupled mechanically to the lens so that setting of the range automatically focusses the lens; some also have built in exposure meters. The type of range finder in general use indicates a single range, but it would be advantageous if the depth of the field could be indicated visually through the rangefinder instead of being obtained from either a depth of field table or a scale linked to the focussing arrangement. It is, moreover, generally recognised that a spot photometer giving the minimum exposure for detail in the shadows is preferable to an exposure based on the average illumination of the subject area.

A method of focussing cameras with apparatus of the instant invention consists of injecting from a common source into both lines of vision of a binocular viewing system virtual images of an indicating mark or marks or the like which are brought into binocular fusion, the virtual images being movable, whilst maintaining their relative positions, under the control of the focus adjustment mechanism of the camera, to indicate the range of the camera focus.

A stereoscopic binocular rangefinder according to the invention comprises a plate or disc, e.g. a diapositive, bearing a light transmitting indicating mark or marks, a collimator and a reflecting surface on which light passing through the indicating mark or marks on the plate or disc and the collimator is directed, a semi-reflector interposed between the collimator and the reflecting surface and a second reflecting surface for receiving reflections from the semi-reflector, the reflecting surfaces being so arranged that each injects a virtual image of the mark or marks, directed through the collimator, into one or other of the lines of vision of a binocular viewing system, the virtual images of the mark or marks so injected being adjustable to bring them into binocular fusion.

Preferably the rangefinder is fitted with two controls, the first of which may be coupled to the focus control of the lens of a camera, varies the distance of the virtual image of the mark or marks in space and may be compared to the normal focussing on an object, and the second, which may be coupled to the lens aperture control of the camera, varies the apparent distance between the furthest and nearest of the marks when two or more marks are employed.

The focus limit markings on the plate or disc may consist of any convenient shape or form, preferably being holes, dots or circles.

Figure 2:
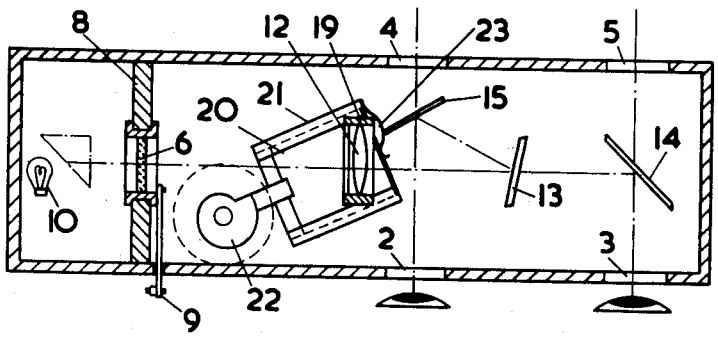
Figure 3:
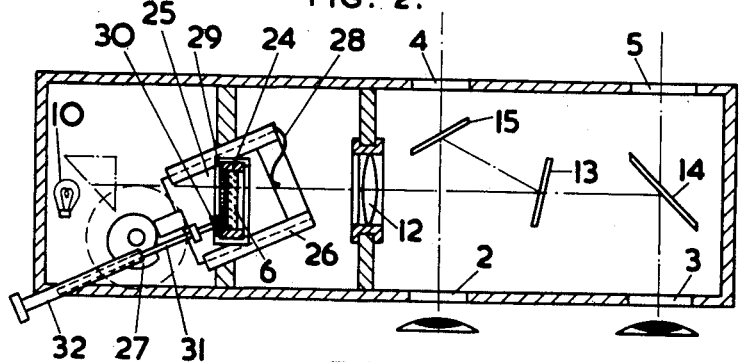
Figure 4:
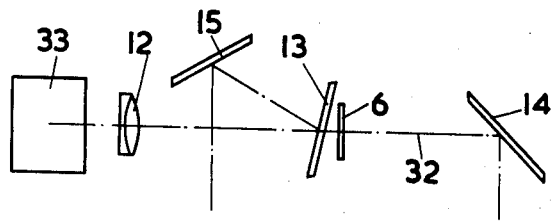
Figure 5:
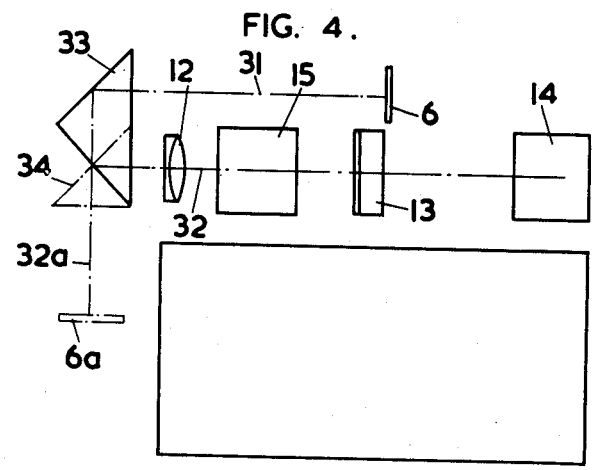
Figure 6:
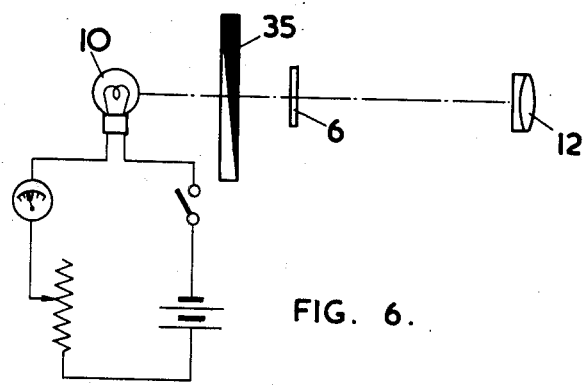

The invention is illustrated diagrammatically, by way of example, in the accompanying drawing in which,
FIGURES 1–3 are longitudinal sectional views of embodiments of rangefinders according to the invention.
FIGURES 4 and 5 show diagrammatically in side view and plan a disposition of components according to further modifications and
FIGURE 6 shows diagrammatically the use of the device as a photometer.

As shown in FIGURE 1 the rangefinder comprises a casing 1, provided with two viewing apertures 2, 3 and two apertures 4, 5 aligned with the apertures 2, 3. Housed within the casing 1, is a rotary plate or disc 6, consisting of a diapositive made by any suitable process (e.g. photographically or by precision piercing or drilling of a metal sheet) the said diapositive having three small circular holes vertically in line and equi-spaced with the middle hole centrally located in the diapositive. This diapositive is mounted in a frame or carrier 7, rotatable in a suitable support or partition 8. This permits rotation of the diapositive about an axis normal to its plane and passing through the centrally located hole. The diapositive frame or carrier is coupled by mechanical means e.g. linkage 9, to the camera mechanism (not shown) used for altering the lens aperture, so that any adjustment of the lens aperture causes the diapositive to rotate to a precalculated position. The diapositive, which is illuminated by light from a lamp 10, or by exterior lighting, e.g. daylight reflected by a small prism 11, is placed at the focus of a collimating lens 12, the optical axis being at right angles to the line of sight of the observer. The collimated beam produced passes across the line of sight of both eyes of an observer to the target. Along the beam axis at a position between the observer's eyes is a semi-reflecting mirror 13, which permits the passage of light to a semi-transparent mirror 14, from which it is reflected to the eye of the observer furthest from the collimating lens. Light reflected by the semi-reflecting mirror 13, is directed on to another semi-transparent mirror 15 from which it is reflected to the other eye of the observer. The mirror 15, is so disposed that it does not interrupt the beam of light from the collimating lens to the semi-reflecting mirror 13. The mirrors 14, 15 which are respectively located between the apertures 3, 5, and 2, 4, have the same reflection-transmission characteristics as one another, and the target is viewed through them. The reflecting surfaces of these three mirrors are disposed in vertical planes but are oriented to reflect the light in the manner described above. The optical path lengths from the collimating lens to each eye of an observer are equal. The virtual image of the marks on the diapositive seen in the mirror 14 will be inverted laterally, but that seen in the mirror 15 will not be so inverted; thus a stereoscopic pair of virtual images is presented. The collimating lens 12, is eccentrically mounted in a frame or carrier 16, which permits movement simultaneously along the optical axis and also transversely of such optical axis and substantially parallel to the line of sight. The second movement causes the apparent position of the virtual image in space to advance or recede whilst the first movement makes the virtual image appear without parallax at the target distance. Thus observers with differing eye separations will see the virtual image stereoscopically at the same distance. These two movements are compounded by providing the carrier 16 with a helical groove or thread 16a which engages a threaded hole in its support or partition 17. The focussing mechanism for the camera lens is coupled, e.g. by linkage 18, to the frame or carrier 16 to control this compound movement.

If a line passing through the holes in the diapositive were perpendicular to the plane passing through the axes of the lines of sight then three spots, i.e. the virtual images of the holes in the diapositive, would appear at the same distance, and because of the mechanical coupling, the lens would be focussed at that distance. If the diapositive were then rotated in the appropriate direction the upper spot would appear to recede and the lower spot advance in space, the central spot remaining at the same apparent distance. This apparent movement can be calculated to accord with the depth of field for any lens diameter while the rotation of the diapositive can be marked in lens aperture opening numbers (stop numbers) with a sliding scale to suit the range of focal lengths needed or coupled as stated previously.

It will be appreciated that the conditions of the line passing through the holes in the diapositive being perpendicular is hypothetical and would not occur if the rangefinder were properly adjusted, as there is always some depth of field even at the largest apertures.

The holes in the diapositive may be of graded sizes so that when viewed as a virtual image the larger ones will be nearer.

According to the modification shown in FIGURE 2 the compound movement imparted to the collimating lens 12 may be obtained by supporting its mounting 19 on a carrier or frame 20 supported in guideways 21 inclined to the axis of the collimator, or on pivoted or flexible arms whereby, as the frame and lens are moved axially by a cam 22 against the action of a spring 23 they are also moved across the beam of light passing beyond the rotary plate or disc.

If desired, however, the collimating lens may be fixed in position relative to the mirrors as shown in FIGURE 3. In this case only the rotary plate or disc 6, e.g. the diapositive, can be suitable moved to obtain the required relative movement between it and the collimator. In this case the rotary plate or disc 6 is carried in a mounting 24 which is secured to a carrier or frame 25 slidable in a guideway 26 inclined to the axis of and also the face of the plate or disc 6. The carrier or frame 25 is acted upon by a cam 27 against the action of a spring 28. The rim of the mounting 24 has bevelled gear teeth formed thereon with which engages a bevel toothed wheel 30 secured upon a spindle 31 splined in a spindle 32. The plate or disc 6 is thus subjected to three movements, i.e. a simultaneous movement towards and away from the collimating lens 12 and also a movement normal thereto, both under the control of the cam 27, and a rotary movement about its centre by rotation of the bevel toothed gear 30.

In order to compact the rangefinder the rotary plate or disc 6, the collimating lens 12, and the semi-reflector 13, need not be in axial alignment as shown in FIGURES 1 to 4. For example, as shown in FIGURES 4 and 5, the axis 31 of the rotary plate or disc 6 may be parallel to the axis 32 of the collimating lens 12 and a prism 33 may be employed to reflect light passing through the plate or disc 6 to the collimating lens 12. Alternatively, as shown in dotted chain line in FIGURE 5, a plate or disc 6a may rotate about an axis 31a normal to the axis 32 of the collimating lens 12. In this case light passing through the plate or disc 6a is reflected by a prism 34 onto the collimating lens 12.

If desired prisms may be used in place of the mirrors.

The rangefinder may be used as a photometer as shown for example in FIGURE 6. In this case a source of light 10 is directed through a neutral density wedge 35 onto the diapositive 6, so that the brightness of the light passing through the diapositive can be varied by movement of the wedge 35. If desired the photometer setting mechanism can be connected with the shutter and aperture controls to give the correct exposure automatically.

Though described as coupled to a camera the rangefinder can equally well be made as an independent instrument.

I claim:
1. A stereoscopic binocular range finder comprising a rotary plate bearing at least one light transmitting indicator mark, means for rotating said plate according to a lens aperture adjustment, a collimator and a semi-reflector on to which light passing through the rotary plate and the collimator is directed, a second semi-reflector located in one line of binocular vision and upon which is directed light passing through the first semi-reflector, and a third semi-reflector located in the second line of binocular vision and on which light reflected by the first semi-reflector is directed and means for effecting relative movement of the rotary plate and the collimator in accordance with movement of the lens focusing adjustment to bring the images of indicating marks in the binocular vision into fusion.

2. A stereoscopic binocular range finder comprising a rotary plate bearing at least one light transmitting indicator mark, linkwork for connecting said plate to the aperture control of a camera, a collimator movable along its axis and also normal thereto, linkwork for connecting said collimator and the focus adjustment mechanism of the camera to impart such movement to the collimator in accordance with the focal adjustment of the camera, a semi-reflector on to which is directed light passing through the rotary plate and the collimator, a second semi-reflector located in one line of binocular vision and upon which is directed light passing through the first semi-reflector, and a third semi-reflector located in the second line of binocular vision and on which is directed light reflected by the first semi-reflector.

3. A stereoscopic binocular range finder as claimed in claim 2, comprising a rotatable carrier in which the collimator is eccentrically mounted, said carrier having an external screw-threaded perimeter, a support having an internally screw-threaded hole with which the rotatable carrier engages, and linkwork for connecting said carrier and the focus adjustment mechanism of the camera.

4. A stereoscopic binocular range finder as claimed in claim 2, comprising a collimator mounting, a carrier to which said mounting is secured, a guideway inclined to the axis of the collimator in which guideway said carrier can slide, a cam for adjusting the position of the carrier in said guideway, a spring acting on the carrier against the cam, and means for connecting said carrier and the focus adjustment mechanism of the camera.

5. A stereoscopic binocular range finder comprising a plate bearing at least one light transmitting indicator mark, a rotatable mounting carrying said plate, a carrier to which said mounting is secured, a guideway in which said carrier can slide, said guideway being inclined to the face of said plate, means for moving the plate in accordance with the aperture adjustment and focus adjustment of a lens, a collimator through which light passing through the plate is directed, a semi-reflector to receive light from said collimator, and semi-reflectors located in each line of binocular vision, one of said semi-reflectors receiving reflected light from said first semi-reflector and the other receiving light which passes through said first semi-reflector.

6. A stereoscopic binocular range finder as claimed in claim 5, comprising gearing for rotating the plate mounting and an extensible shaft drive for transmitting movement to said gearing.

7. A stereoscopic binocular range finder as claimed in claim 5, comprising a cam and a spring for controlling the position of the carrier in the guideway.

8. A stereoscopic binocular range finder comprising a plate bearing at least one light transmitting indicator mark, means for adjusting said plate in accordance with a lens aperture adjustment, a collimater, a prism for directing light passing through the plate into said collimator, means for effecting relative movement between the rotary plate and the collimator in accordance with the lens focussing adjustment, a semi-reflector for receiving light passing from said collimator, a second semi-reflector arranged in one line of binocular vision and upon which is directed light passing through the first semi-reflector, and a third semi-reflector arranged in the second line of binocular vision and on which is directed the light reflected by the first semi-reflector.

9. A steroscopic binocular range finder comprising a plate bearing at least one light transmitting indicator mark, means associated with a lens aperture adjustment for controlling the movement of said plate, a collimator, means controlled by the lens focussing adjustment for effecting relative movement between said plate and said collimator, a semi-reflector on to which light passing through the rotary plate and the collimator is directed, a movable neutral light wedge to control the intensity of the light received by the semi-reflector, a second semi-reflector located in one line of binocular vision and disposed to receive light passing through said first semi-reflector, and a third semi-reflector located in the second line of binocular vision and on which light reflected by the first semi-reflector is directed.

10. A steroscopic range finder comprising a rotary plate bearing light transmitting indicating means a collimator and a semi-reflector on to which light passing through the rotary plate and the collimator is directed, a second semi-reflector located in one line of binocular vision and upon which is directed light passing through said first semi-reflector, a third semi-reflector located in the second line of binocular vision on to which light reflected from said first semi-reflector is directed, means for rotating said rotary plate in accordance with the aperture adjustment of the camera lens and means for adjusting the distance apart axially of the rotary plate and the collimator and for adjusting the position of the rotary plate and collimator normal to their axes in dependence of the focus adjustment of the camera.

11. A steroscopic binocular camera range finder of the wandermark type comprising a source of light, a collimator, a plate bearing three aligned indicator marks, said plate being rotatable about the central mark and located between the source of light and said collimator, an image splitting means beyond said colimator to inject a virtual image of the three marks into one line of vision of a binocular system and an identical but laterally inverted virtual image of said aligned indicating marks into the second line of vision of the binocular system, means for rotating said plate in accordance with the adjustment of the aperture of a camera lens, and adjustment means operated in accordance with the movement of the camera focus adjustment to impart relative movement between the rotatable plate and the collimator to bring the corresponding virtual images in both lines of vision into fusion to present three aligned virtual indicating marks to indicate with the central mark the range of the camera focus, and with the outer marks the depth of field which is in focus.

References Cited by the Examiner
UNITED STATES PATENTS

| | | | |
|---|---|---|---|
| 1,987,765 | 1/35 | Wandersleb | 95—44 |
| 2,407,306 | 9/46 | Land | 88—2.7 |
| 2,547,232 | 4/51 | Schwarz et al. | 88—2.7 |

EVON C. BLUNK, *Primary Examiner.*

EMIL G. ANDERSON, JOHN M. HORAN,
*Examiners.*